United States Patent
Smith et al.

(10) Patent No.: US 12,270,424 B2
(45) Date of Patent: Apr. 8, 2025

(54) STAGGERED PERIODIC RIBLETS

(71) Applicant: Lockheed Martin Corporation, Bethesda, MD (US)

(72) Inventors: Brian R. Smith, Colleyville, TX (US); Patrick J. Yagle, Fort Worth, TX (US); Paul Douglas McClure, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/547,378

(22) Filed: Aug. 21, 2019

(65) Prior Publication Data

US 2021/0231141 A1 Jul. 29, 2021

(51) Int. Cl.
*F15D 1/00* (2006.01)
*B64C 21/10* (2006.01)

(52) U.S. Cl.
CPC .............. *F15D 1/004* (2013.01); *B64C 21/10* (2013.01); *B64C 2230/26* (2013.01)

(58) Field of Classification Search
CPC ...... B64C 2230/26; B64C 21/10; F15D 1/004
See application file for complete search history.

(56) References Cited

U.S. PATENT DOCUMENTS

| | | | |
|---|---|---|---|
| 2,261,558 A | 11/1941 | Orloff | |
| 2,800,291 A | 7/1957 | Stephens | |
| 3,578,264 A * | 5/1971 | Kuethe | F28F 1/32 181/220 |
| 4,004,615 A * | 1/1977 | Stern | F16L 57/06 55/435 |

(Continued)

FOREIGN PATENT DOCUMENTS

| | | | |
|---|---|---|---|
| DE | 3609541 A1 * | 9/1987 | ............... B63B 1/34 |
| DE | 102006023557 A1 | 11/2007 | |

(Continued)

OTHER PUBLICATIONS

Walsh, M.J. "Turbulent Boundary Layer Drag Reduction Using Riblets." Jan. 14, 1982. AIAA-82-0169. 9 pages. (Year: 1982).*

(Continued)

*Primary Examiner* — Philip J Bonzell
*Assistant Examiner* — Michael B. Kreiner
(74) *Attorney, Agent, or Firm* — Baker Botts L.L.P.

(57) ABSTRACT

In one embodiment, a method for reducing drag includes forming first periodic riblets on a smooth surface of a physical object and forming second periodic riblets on the smooth surface of the physical object. The method further includes generating a flow over the first and second periodic riblets of the physical object. Each first periodic riblet comprises a first transition region at a first end of each first periodic riblet and a second transition region at a second end of each first periodic riblet. Each second periodic riblet comprises a first transition region at a first end of each second periodic riblet and a second transition region at a second end of each second periodic riblet. Each second transition region at the second end of each first periodic riblet overlaps each first transition region at the first end of each second periodic riblet. A length of each riblet of the first and second periodic riblets runs parallel to a direction of the flow.

14 Claims, 9 Drawing Sheets

(56) References Cited

U.S. PATENT DOCUMENTS

| | | | |
|---|---|---|---|
| 4,284,302 A | 8/1981 | Drews | |
| 4,455,045 A | 6/1984 | Wheeler | |
| 4,706,910 A | 11/1987 | Walsh | |
| 4,750,693 A | 6/1988 | Löbert et al. | |
| 4,753,401 A | 6/1988 | Bechert | |
| 4,830,315 A | 5/1989 | Presz, Jr. et al. | |
| 4,907,765 A | 3/1990 | Hirschel et al. | |
| 5,052,963 A | 10/1991 | Johnson, III | |
| 5,114,099 A * | 5/1992 | Gao | B64C 21/10 244/130 |
| 5,171,623 A | 12/1992 | Yee | |
| 5,378,524 A | 1/1995 | Blood | |
| 5,481,996 A | 1/1996 | Osawa et al. | |
| 5,598,990 A | 2/1997 | Farokhi et al. | |
| 5,833,389 A | 11/1998 | Sirovich et al. | |
| 5,860,626 A | 1/1999 | Moser | |
| 5,988,568 A * | 11/1999 | Drews | B64C 21/10 296/180.1 |
| 6,345,791 B1 | 2/2002 | McClure | |
| 6,880,476 B2 | 4/2005 | Olsen et al. | |
| 7,604,461 B2 | 10/2009 | Bonnet | |
| 8,226,038 B2 | 7/2012 | Smith et al. | |
| 8,276,851 B2 * | 10/2012 | McKeon | B64C 21/10 244/130 |
| 8,323,775 B2 | 12/2012 | van Merkstoijn | |
| 8,444,092 B2 | 5/2013 | Li et al. | |
| 8,535,781 B2 | 9/2013 | Van Merksteijn | |
| 9,188,287 B2 * | 11/2015 | Krautschick | F17D 1/08 |
| 9,340,281 B2 | 5/2016 | Harrison et al. | |
| 9,482,096 B1 * | 11/2016 | Paesano | F01D 5/141 |
| 9,631,648 B2 * | 4/2017 | Schuetze | F15D 1/12 |
| 11,614,106 B2 * | 3/2023 | Smith | F15D 1/004 244/130 |
| 12,085,102 B2 * | 9/2024 | Smith | B64C 21/10 |
| 2012/0049008 A1 * | 3/2012 | Domel | B64C 30/00 244/200 |
| 2012/0100266 A1 | 4/2012 | Nicholson et al. | |
| 2016/0194076 A1 | 7/2016 | Van Merksteijn | |
| 2018/0030996 A1 | 2/2018 | Schilling et al. | |
| 2018/0229808 A1 | 8/2018 | Wang et al. | |

FOREIGN PATENT DOCUMENTS

| | | |
|---|---|---|
| WO | 8403867 A1 | 10/1984 |
| WO | 2008089790 A1 | 7/2008 |
| WO | WO 2018/165313 A1 | 9/2018 |

OTHER PUBLICATIONS

Smith, B. R. et al., "Submberged Periodic Riblets," U.S. Appl. No. 16/547,304, filed Aug. 21, 2019, 34 pages.

Smith, B. R. et al., "Partially Submerged Periodic Riblets," U.S. Appl. No. 16/547,351, filed Aug. 21, 2019, 36 pages.

European Patent Office communication re Application No. 20191888.5-1010, Jan. 25, 2021.

S. P. Wilkinson, et al., "Turbulent drag reduction research at NASA Langley: Progress and Plans*" received Dec. 1987, © 1988 The Royal Aeronautical Society, pp. 266-277, Apr. 11, 2022.

European Patent Office communication pursuant to Article 94(3) EPC re Application No. 20191888.5-1004, Jul. 26, 2022.

* cited by examiner

STAGGERED PERIODIC RIBLETS

TECHNICAL FIELD

This disclosure generally relates to riblets, and more specifically to staggered periodic riblets.

BACKGROUND

An object (e.g., an aircraft or a marine vessel) that moves through a fluid (e.g., air or water) experiences a drag force. An increase in the drag force experienced by the object increases the energy required for the object to move through the fluid. For example, an increase in the drag force experienced by an aircraft moving at an established speed may increase the power required by the aircraft to move through the air at the same established speed. Thus, drag force has a significant impact of aircraft fuel consumption and aircraft range.

SUMMARY

According to an embodiment, a method for reducing drag includes forming first periodic riblets on a smooth surface of a physical object and forming second periodic riblets on the smooth surface of the physical object. The method further includes generating a flow over the first and second periodic riblets of the physical object. Each first periodic riblet comprises a first transition region at a first end of each first periodic riblet and a second transition region at a second end of each first periodic riblet. Each second periodic riblet comprises a first transition region at a first end of each second periodic riblet and a second transition region at a second end of each second periodic riblet. Each second transition region at the second end of each first periodic riblet overlaps each first transition region at the first end of each second periodic riblet. A length of each riblet of the first and second periodic riblets runs parallel to a direction of the flow.

According to another embodiment, a physical object includes a smooth surface, first periodic riblets on the smooth surface of a physical object, and second periodic riblets on the smooth surface of the physical object. Each first periodic riblet comprises a first transition region at a first end of each first periodic riblet and a second transition region at a second end of each first periodic riblet. Each second periodic riblet comprises a first transition region at a first end of each second periodic riblet and a second transition region at a second end of each second periodic riblet. Each second transition region at the second end of each first periodic riblet overlaps each first transition region at the first end of each second periodic riblet.

According to yet to another embodiment, a method of manufacturing a physical object includes forming first periodic riblets on a smooth surface of a physical object. The method further includes forming second periodic riblets on the smooth surface of the physical object. Each first periodic riblet comprises a first transition region at a first end of each first periodic riblet and a second transition region at a second end of each first periodic riblet. Each second periodic riblet comprises a first transition region at a first end of each second periodic riblet and a second transition region at a second end of each second periodic riblet. Each second transition region at the second end of each first periodic riblet overlaps each first transition region at the first end of each second periodic riblet.

Technical advantages of this disclosure may include one or more of the following. The use of staggered periodic riblets on physical objects reduces overall drag, which includes pressure and viscous drag, experienced by the physical object as compared to physical objects having a smooth surface, which may significantly reduce fuel costs since less power is required to move the object through the fluid (e.g., gas or liquid). The drag reduction experienced by physical objects such as aircraft that use staggered periodic riblets may also increase the range (i.e., the maximum distance the aircraft can fly between takeoff and landing) of the physical object as compared to physical objects that have a smooth surface. In certain embodiments, the drag reduction may allow higher maximum speeds to be obtained for a fixed propulsion input.

In some embodiments, staggered periodic riblets may reduce heat transfer on a hot or cold surface adjacent to a turbulent boundary layer, which may reduce the insulation required in particular applications. The use of staggered periodic riblets may delay or prevent the separation of the flow in a turbulent boundary layer from the surface, which may reduce aerodynamic drag, increase lift on a physical object (e.g., an aircraft wing), and/or improve the performance of propulsion systems.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Embodiments of this disclosure describe physical objects having staggered periodic riblets that may be used to reduce drag, which includes pressure drag and friction drag, over the surfaces of the physical objects. Riblets are very small (e.g., less than a hundredth of an inch in depth) grooves or channels on a surface of a physical object (e.g., a vehicle). The riblets run parallel to the direction of flow. Staggered periodic riblets are riblets with overlapping regions. Staggered periodic riblets are located above a smooth surface of the physical object.

Certain three-dimensional (3D) riblet structures may reduce skin friction drag due to reduced wetted area. However, these 3D riblet structures may generate additional pressure drag due to the added frontal area of the surface feature. The staggered periodic riblets described herein increase the drag reducing benefits of riblets by significantly reducing or eliminating the pressure drag penalty as compared to certain other 3D riblet structures. Staggered periodic riblets may maintain a constant cross sectional area in the streamwise flow direction. The constant cross sectional area is achieved by compensating the decreasing volume of the trailing edge of each staggered periodic riblet with the increasing volume of the neighboring staggered periodic riblets. As such, embodiments of this disclosure use staggered periodic riblets to reduce and/or eliminate the pressure drag penalty as compared to certain other periodic riblets.

Figure 2A:
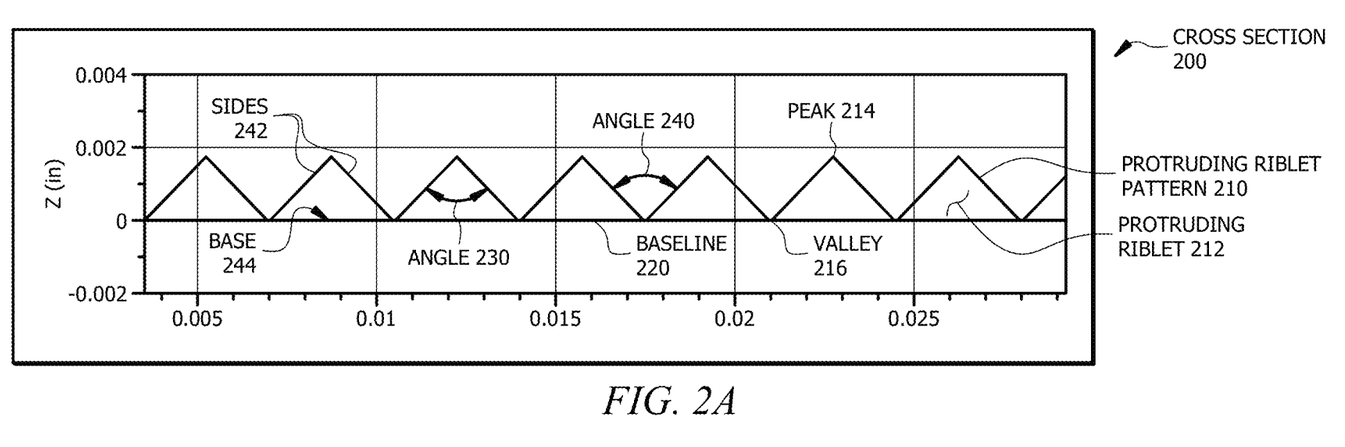
FIG. 2A illustrates a cross section of a protruding riblet pattern, in accordance with an example embodiment.
Figure 2B:
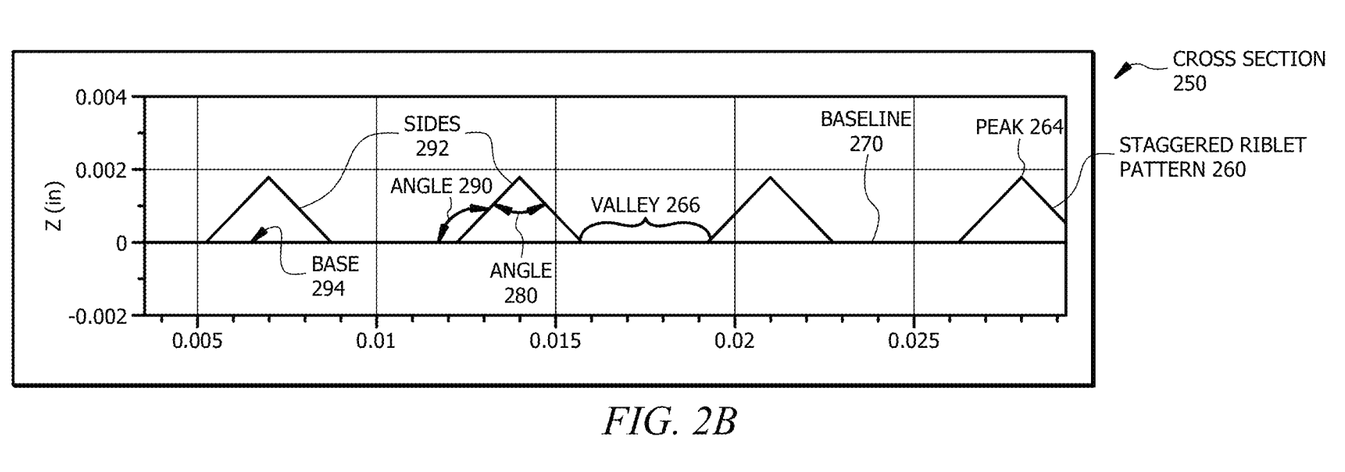
FIG. 2B illustrates a cross section of a staggered riblet pattern, in accordance with an example embodiment.
Figure 3A:
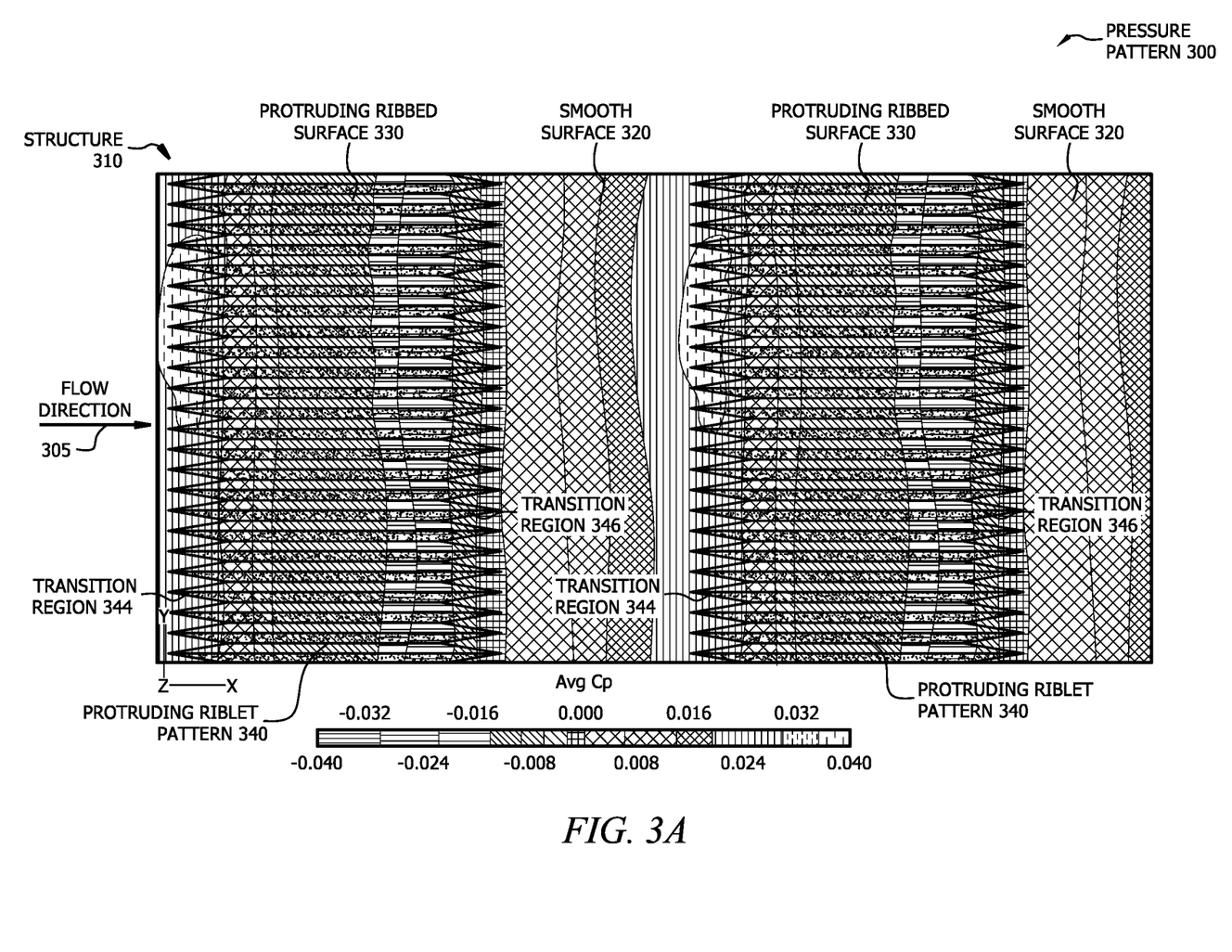
FIG. 3A illustrates a pressure output pattern associated with a physical object having a protruding riblet pattern, in accordance with an example embodiment.
Figure 3B:
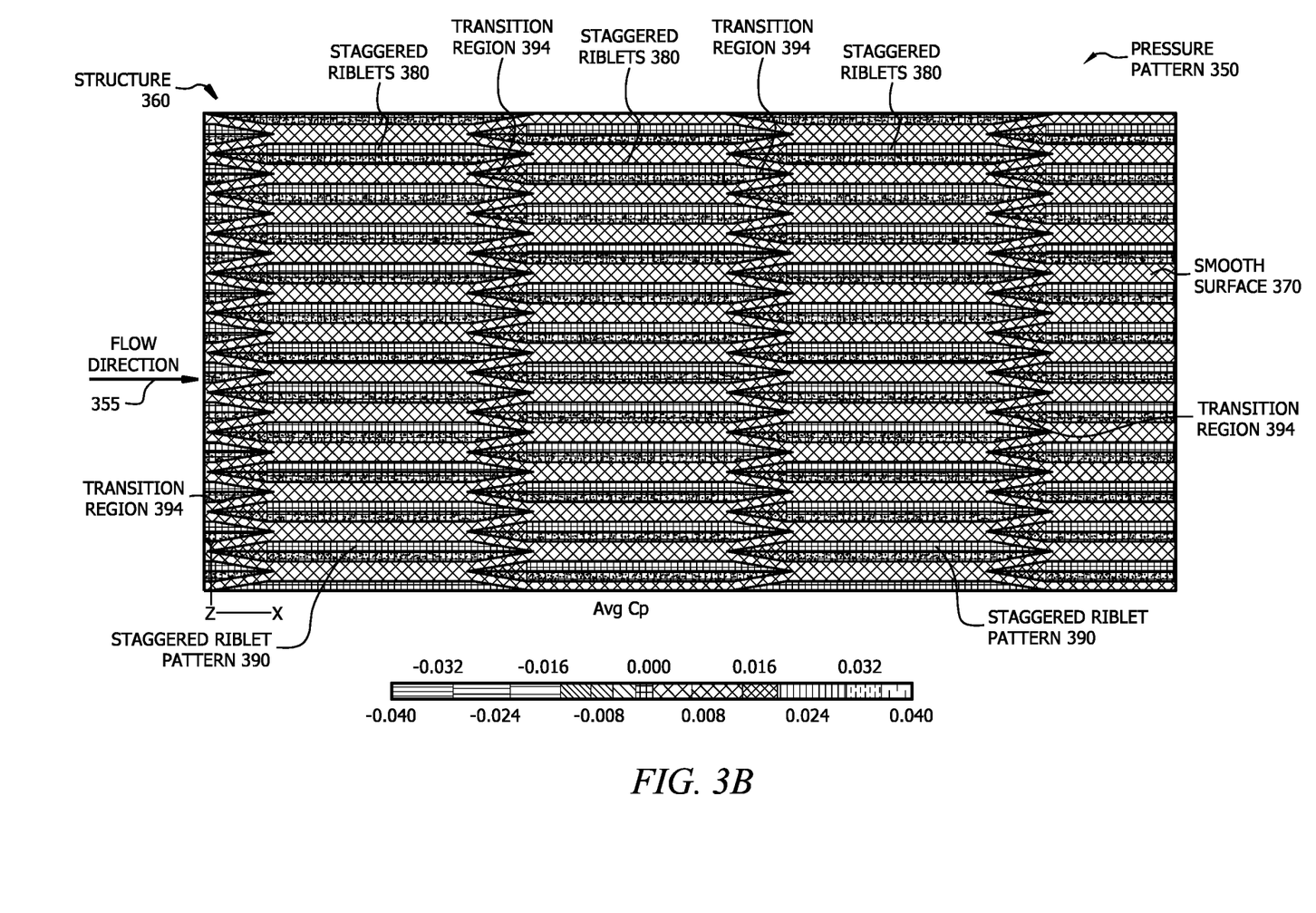
FIG. 3B illustrates a pressure output pattern associated with a physical object having a staggered riblet pattern, in accordance with an example embodiment.
Figure 4:
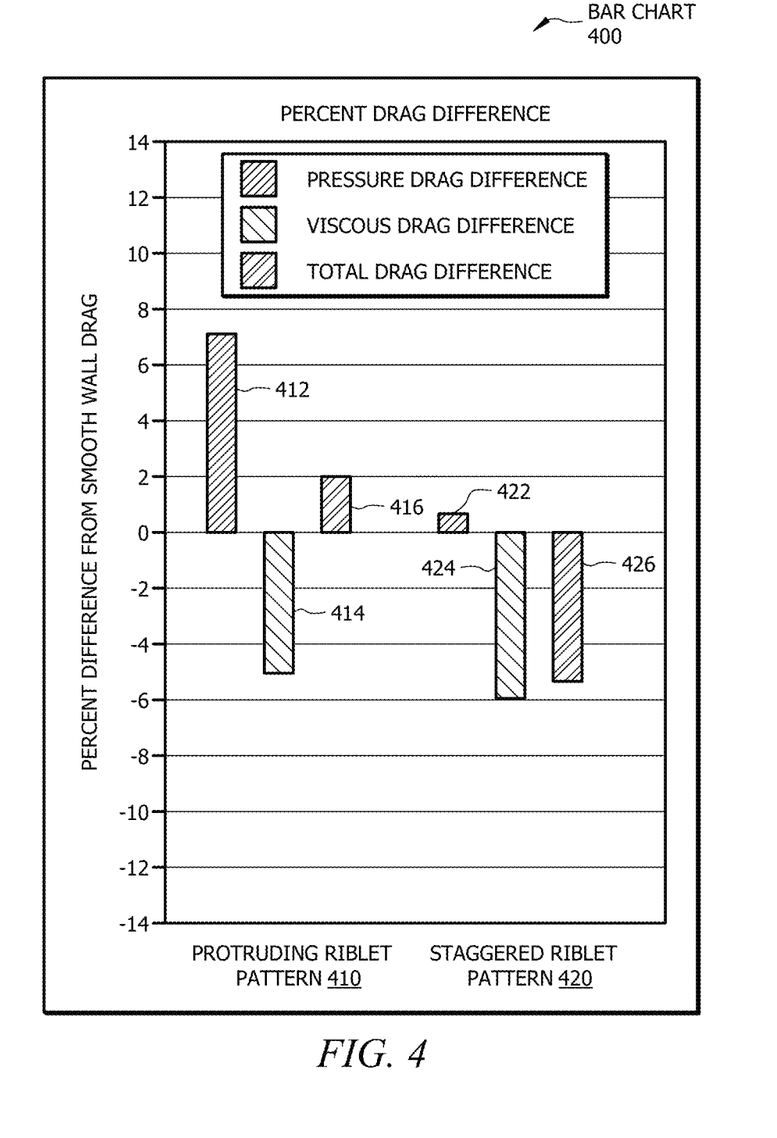
FIG. 4 illustrates a bar chart that compares drag produced by a physical object having a protruding riblet pattern to a physical object having a staggered riblet pattern, in accordance with an example embodiment.
Figure 5:
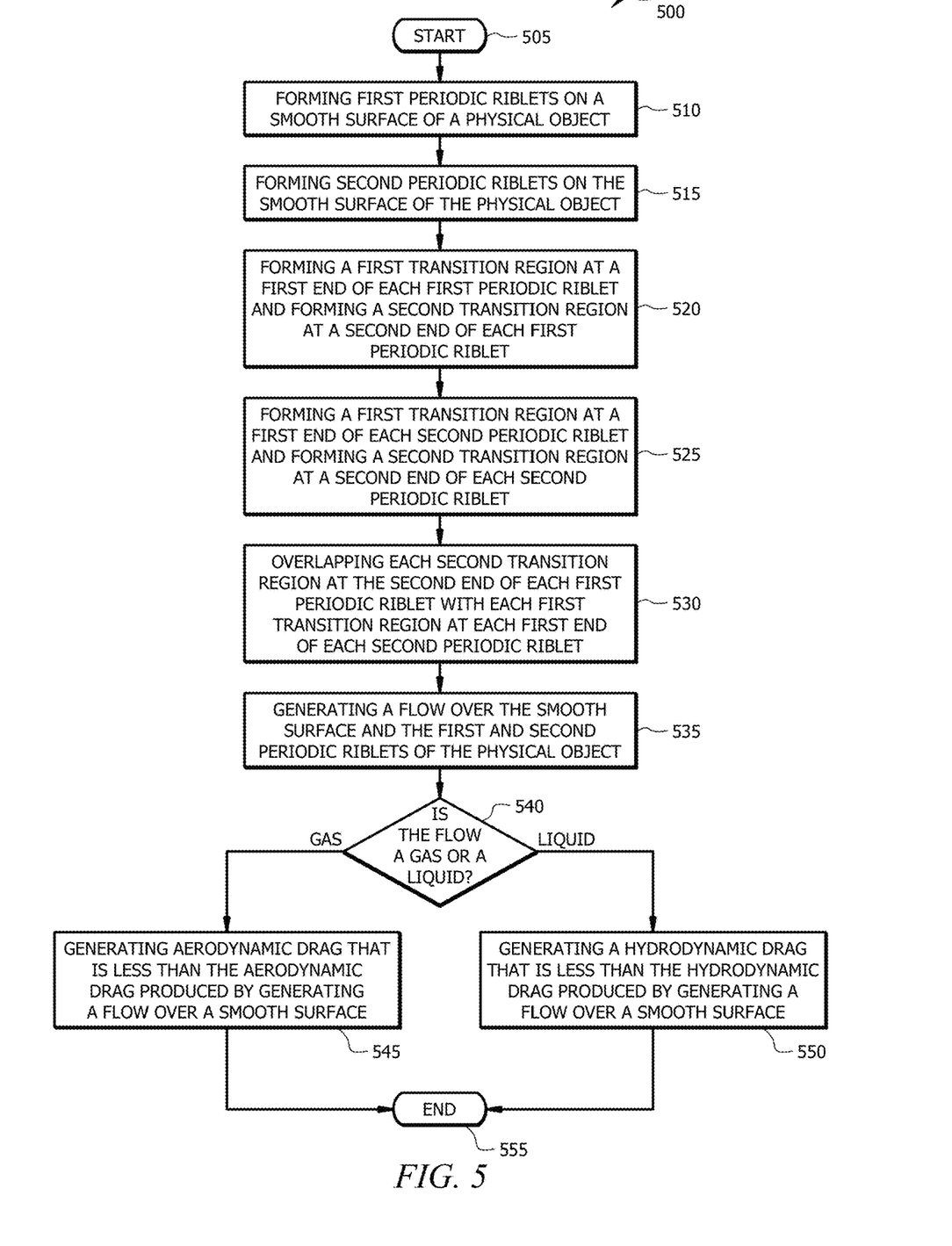
FIG. 5 illustrates an example method for reducing drag on a surface using a staggered riblet pattern, in accordance with an example embodiment.
Figure 6:
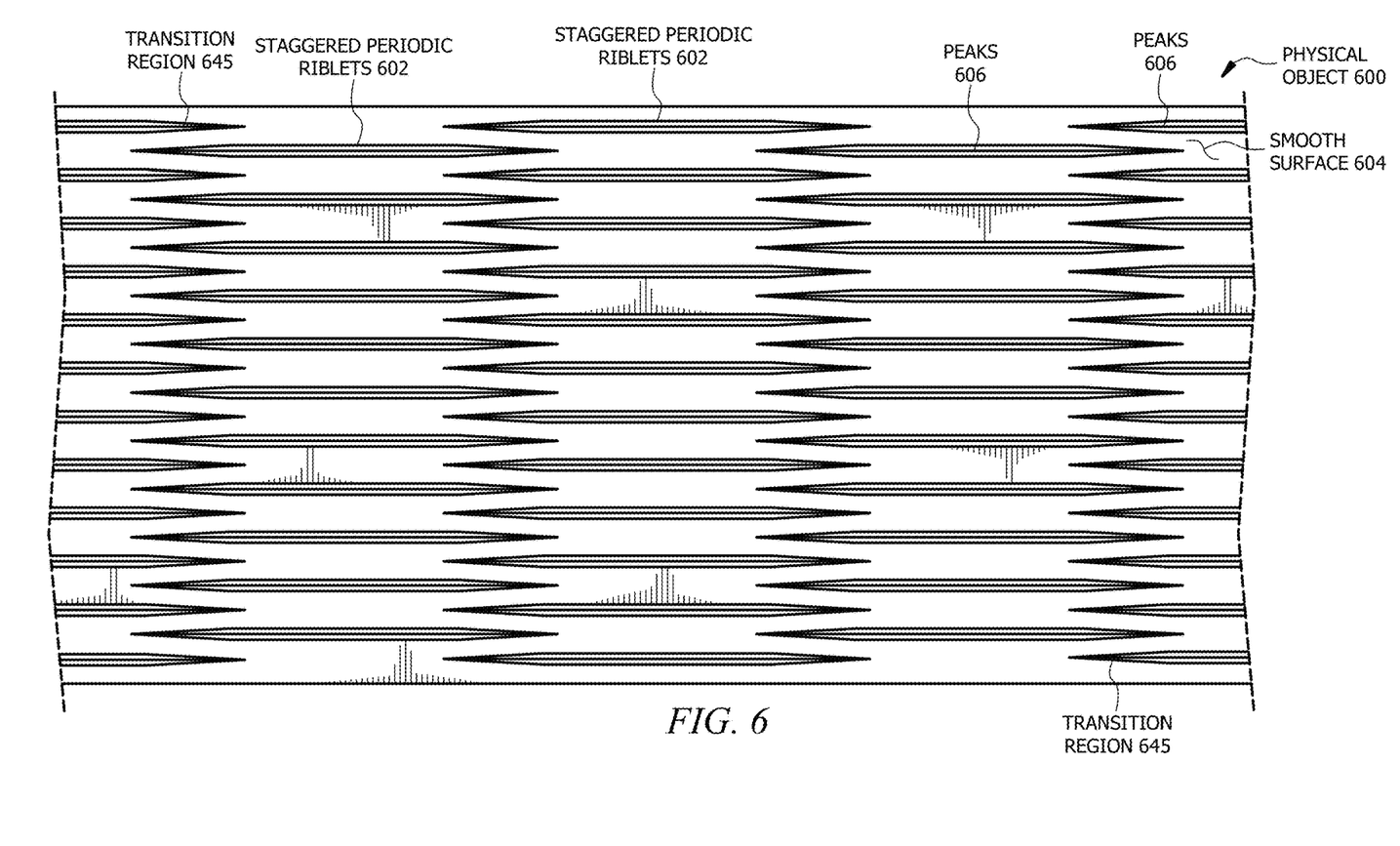
FIG. 6 illustrates a physical object with staggered periodic riblets having a different size and shape than the staggered periodic riblets of FIG. 1A, in accordance with an example embodiment.
Figure 7:
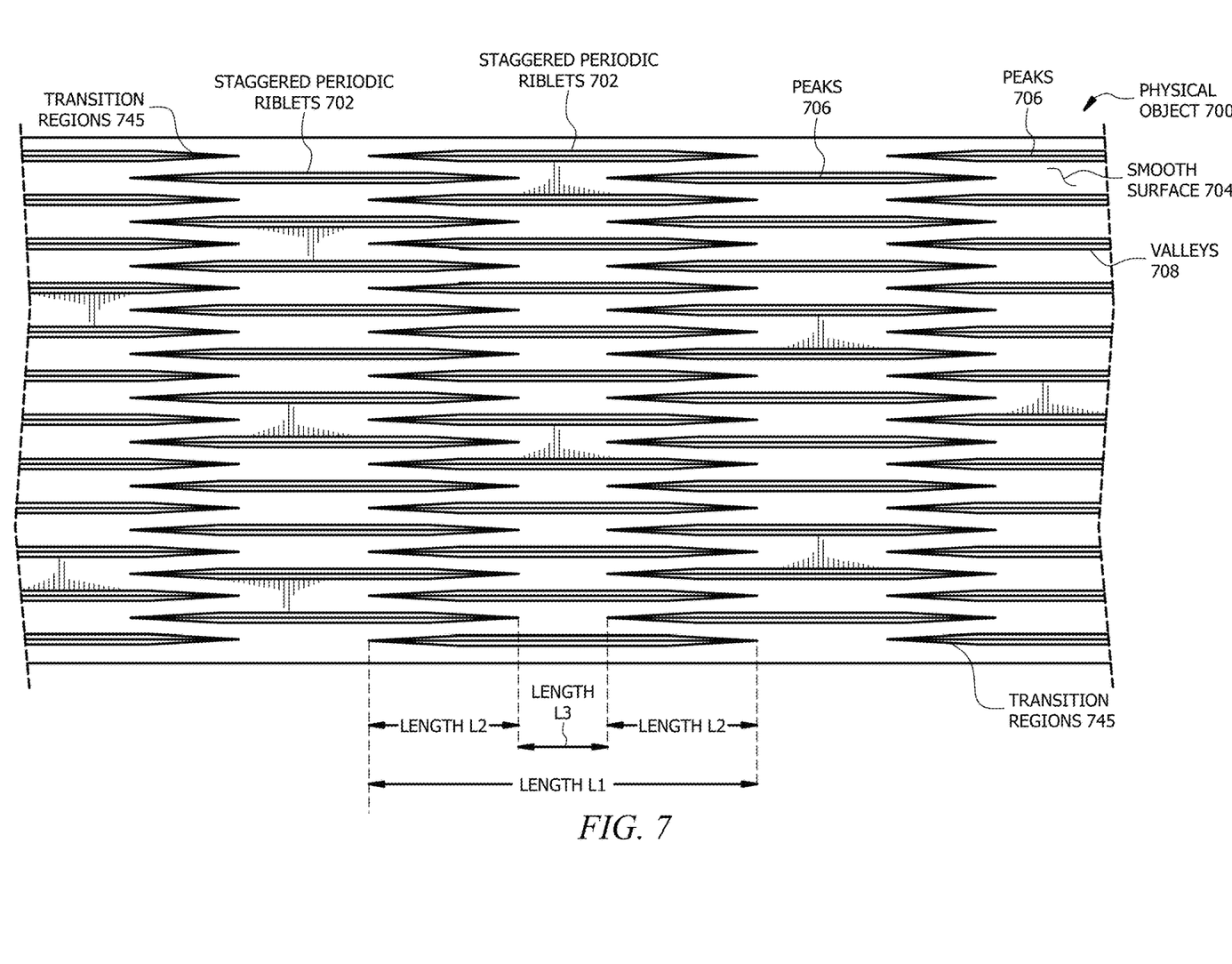
FIG. 7 illustrates a physical object with staggered periodic riblets having a different size, shape, and arrangement than the staggered periodic riblets of FIG. 1A, in accordance with an example embodiment.

FIGS. 1 through 5 show example apparatuses and methods associated with staggered periodic riblets. FIG. 1A shows an example physical object with staggered periodic riblets and FIG. 1B shows an example longitudinal section of the physical object of FIG. 1A. FIG. 2A shows an example cross section of a protruding riblet pattern and FIG. 2B shows an example cross section of a staggered riblet pattern. FIG. 3A shows an example pressure output pattern associated with a physical object having a protruding riblet pattern and FIG. 3B shows an example pressure output pattern associated with a physical object having a staggered riblet pattern. FIG. 4 shows an example bar chart that compares drag produced by a physical object having a protruding riblet pattern to a physical object having a staggered riblet pattern. FIG. 5 shows an example method for reducing drag on a surface using a staggered riblet pattern. FIG. 6 shows a physical object with staggered periodic riblets having a different size and shape than the staggered periodic riblets of FIG. 1A, and FIG. 7 shows a physical object with staggered periodic riblets having a different size, shape, and arrangement than the staggered periodic riblets of FIG. 1A.

Figure 1A:
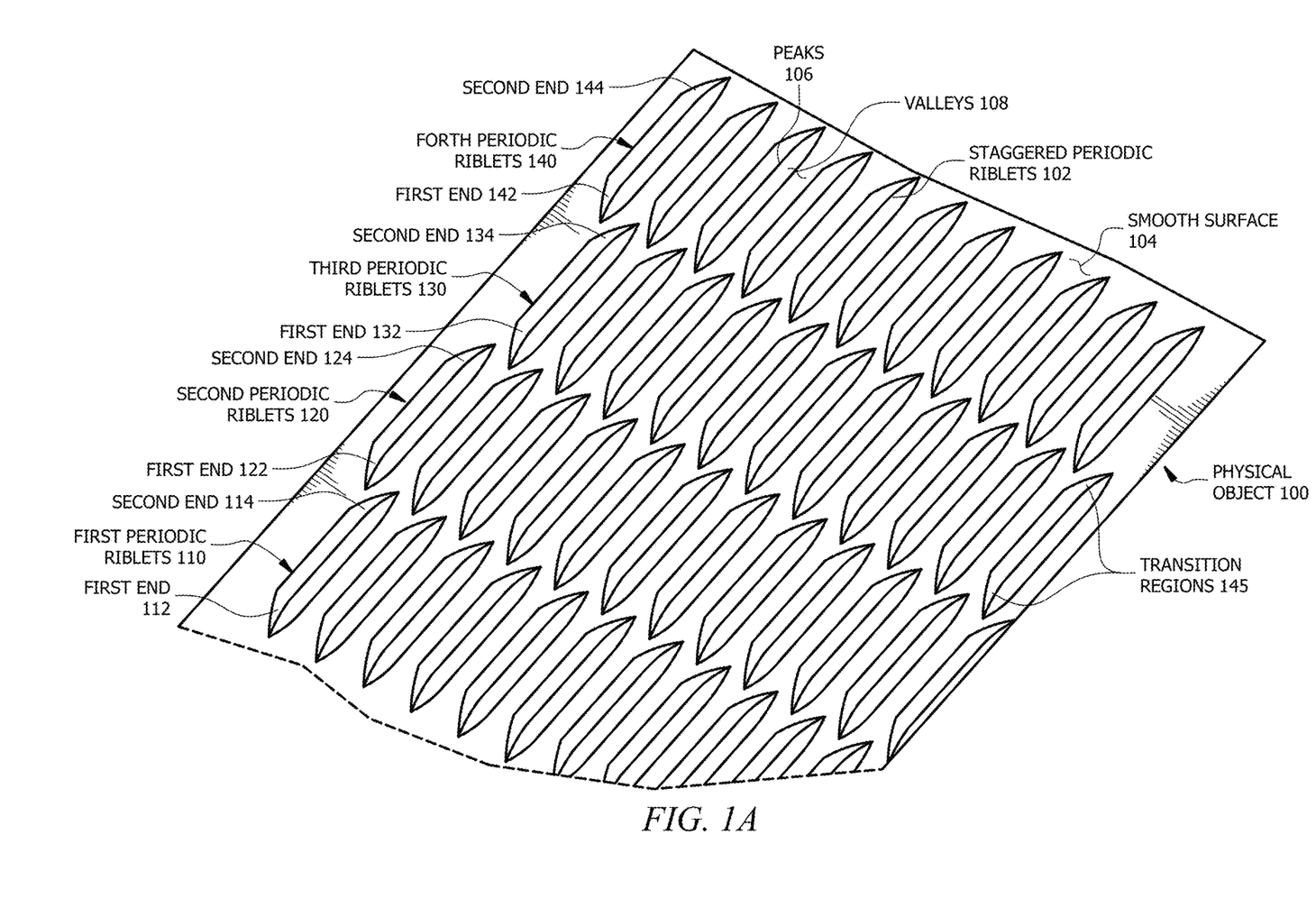
FIG. 1A illustrates a physical object with staggered periodic riblets, in accordance with an example embodiment.

FIG. 1A illustrates an example physical object 100 having staggered periodic riblets 102. Physical object 100 with staggered periodic riblets 102 may be used to reduce overall drag (e.g., aerodynamic or hydrodynamic drag) over a surface as compared to a physical object 100 without staggered periodic riblets 102. One or more portions of physical object 100 may be made of steel, aluminum, copper, titanium, nickel, plastic, fiberglass, a combination thereof, or any other suitable material.

Physical object 100 is any object that is susceptible to drag (e.g., skin friction drag and pressure drag.) For example, physical object 100 may be a component (e.g., a portion of an outer body) of an aircraft (e.g., an airplane, a helicopter, a blimp, a drone, etc.), a component of a marine vessel (e.g., a cargo ship, a passenger ship, a canoe, a raft, etc.), a component of a motorized vehicle (e.g., a truck, a car, a train, a scooter, etc.), a component of a non-motorized vehicle (e.g., a bicycle, a skateboard, etc.), a component of a spacecraft (e.g., a spaceship, a satellite, etc.), a wind turbine, a projectile (e.g., a missile), or any other physical object that is capable of experiencing drag. In certain embodiments, drag may be generated by a force acting opposite to the relative motion of physical object 100 (e.g., a wing of an aircraft) moving with respect to a surrounding fluid (e.g., air). In some embodiments, drag is generated by the viscosity of gas. In certain embodiments, drag may be generated due to the viscosity of a fluid (e.g., water) near the surface of physical object 100 (e.g., a section of a pipe or duct.)

Physical object 100 includes a smooth surface 104. In certain embodiments, smooth surface 104 of physical object 100 is flat. In some embodiments, smooth surface 104 of physical object 100 may have a curvature. Staggered periodic riblets 102 of physical object 100 may be formed on smooth surface 104. Staggered periodic riblets 102 of physical object 100 are staggered such that each staggered periodic riblet 102 overlaps at least one other staggered periodic riblet 102 in plan view. Each staggered periodic riblet 102 is located above a plane (e.g., plane 180 of FIG. 1B) of smooth surface 104 of physical object 100. In certain embodiments, a cross sectional area as measured above smooth surface 104 of physical object 100 is approximately (i.e., within five percent) the same at any cross section through staggered periodic riblets 102.

Each staggered periodic riblet 102 includes a peak 106. Each peak 106 of each staggered periodic riblet 102 is a point along an exterior surface of staggered periodic riblet 102 that is farthest away from the plane of smooth surface 104 in a direction away from physical object 100. In the illustrated embodiment of FIG. 1A, peaks 106 of staggered periodic riblets 102 extend a predetermined distance (e.g., 0.002 inches) above the plane of smooth surface 104 of physical object 100. In some embodiments, one or more peaks 106 of one or more staggered periodic riblets 102 may form a pointed tip. In some embodiments, one or more peaks 106 of one or more staggered periodic riblets 102 may form a flat or rounded peak surface. The spaces between adjacent staggered periodic riblets 102 create valleys 108. Each valley 108 between adjacent staggered periodic riblets 102 is an area along an exterior surface of staggered periodic riblet 102 that is closest to the plane of smooth surface 104. In the illustrated embodiment of FIG. 1A, valleys 108 of staggered periodic riblets 102 are located along the plane of smooth surface 104 of physical object 100.

Each staggered periodic riblet 102 includes two transition regions 145. A first transition region 145 is located at a first end of each staggered periodic riblet 102 and a second transition region 145 is located at a second end of each staggered periodic riblet 102. Each transition region 145 of each staggered periodic riblet 102 slopes down from peak 106 to smooth surface 104. In certain embodiments, each transition region 145 decreases in height and width as each respective staggered periodic riblet 102 slopes down from peak 106 to smooth surface 104. For example, the height and/or width of each transition region 145 may decrease (e.g., linearly decrease) until the height and/or width equals zero. The slope of each transition region 145 may be linear or parabolic. Transition regions 145 are discussed in more detail in FIG. 1B below. Each staggered periodic riblet 102 may be approximately the same in size, shape, and/or orientation.

Staggered periodic riblets 102 of FIG. 1A include first periodic riblets 110, second periodic riblets 120, third periodic riblets 130, and fourth periodic riblets 140. Each first periodic riblet 110 includes a first end 112 and a second end 114. Each second periodic riblet 120 includes a first end 122 and a second end 124. Each third periodic riblet 130 includes a first end 132 and a second end 134. Each fourth periodic riblet 140 includes a first end 142 and a second end 144.

First periodic riblets 110 of physical object 100 are parallel to one another. In certain embodiments, a distance between each peak 106 of each first periodic riblet 110 is approximately the same. Transition region 145 at each second end 114 of each first periodic riblet 110 overlaps transition region 145 at each first end 124 of each second periodic riblet 120. Second periodic riblets 120 of physical object 100 are parallel to one another. In certain embodiments, a distance between each peak 106 of each second periodic riblet 120 is approximately the same. Transition region 145 at each second end 124 of each second periodic riblet 210 overlaps transition region 145 at each first end 132 of each third periodic riblet 130.

Third periodic riblets 130 of physical object 100 are parallel to one another. In certain embodiments, a distance between each peak 106 of each third periodic riblet 130 is approximately the same. Transition region 145 at each second end 134 of each third periodic riblet 110 overlaps transition region 145 at each first end 142 of each fourth periodic riblet 140. Fourth periodic riblets 140 of physical object 100 are parallel to one another. In certain embodiments, a distance between each peak 106 of each fourth periodic riblet 140 is approximately the same.

While the lengths of first periodic riblets 110, second periodic riblets 120, third periodic riblets 130, and fourth periodic riblets 140 are approximately (e.g., within five percent) the same in the illustrated embodiment of FIG. 1A, the length of each first periodic riblet 110, second periodic riblet 120, third periodic riblet 130, and fourth periodic riblet 140 may be any suitable length. For example, one or more lengths of first periodic riblets 110, second periodic riblets 120, third periodic riblets 130, and fourth periodic riblets 140 may vary by a factor of two.

Although physical object 100 of FIG. 1A illustrates a particular number of staggered periodic riblets 102 (e.g., first periodic riblets 110, second periodic riblets 120, third periodic riblets 130, and fourth periodic riblets 140), smooth surfaces 104, peaks 106, valleys 108, and transition regions 145, this disclosure contemplates any suitable number of staggered periodic riblets 102, smooth surfaces 104, peaks 106, valleys 108, and transition regions 145. For example, physical object 100 of FIG. 1A may include fifth staggered periodic riblets, sixth staggered periodic riblets, and so on.

Although physical object 100 of FIG. 1A illustrates a particular arrangement of staggered periodic riblets 102 (e.g., first periodic riblets 110, second periodic riblets 120, third periodic riblets 130, and fourth periodic riblets 140), smooth surfaces 104, peaks 106, valleys 108, and transition regions 145, this disclosure contemplates any suitable arrangement of staggered periodic riblets 102 (e.g., first periodic riblets 110, second periodic riblets 120, third periodic riblets 130, and fourth periodic riblets 140), smooth surfaces 104, peaks 106, valleys 108, and transition regions 145. For example, staggered periodic riblets 102 may be spaced further apart or closer together.

Figure 1B:
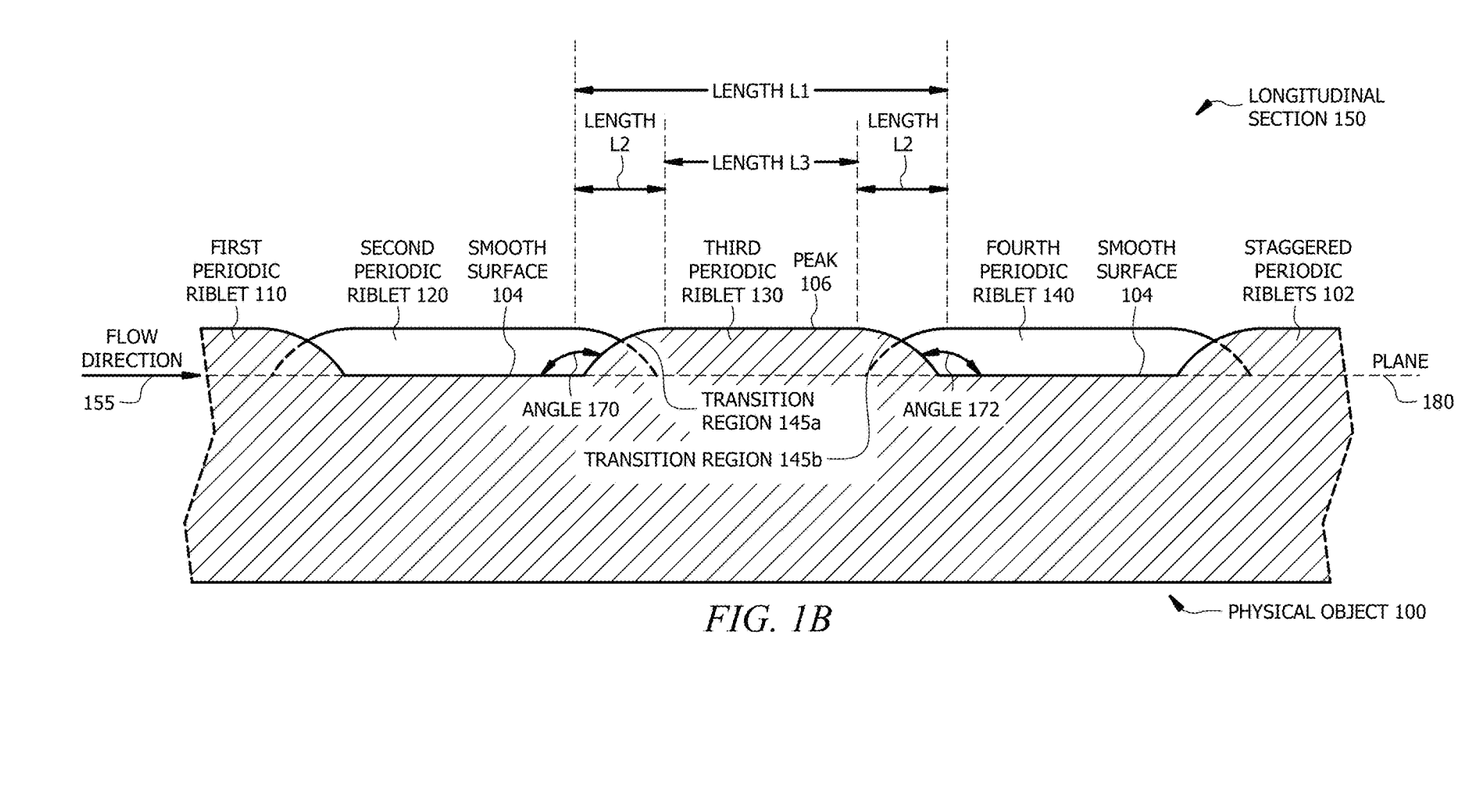
FIG. 1B illustrates a cross section of the physical object of FIG. 1A, in accordance with an example embodiment.

FIG. 1B illustrates an example longitudinal section 150 of physical object 100 of FIG. 1A. Longitudinal section 150 of FIG. 1B is cut through smooth surface 104 and a series of staggered periodic riblets 102. In the illustrated embodiment of FIG. 1B, longitudinal section 150 is cut through first periodic riblet 110 and third periodic riblet 130. First periodic riblet 110 overlaps second periodic riblet 120 and third periodic riblet 130 overlaps second periodic riblet 120 and fourth periodic riblet 140. Each staggered periodic riblet 102 is located above plane 180 of smooth surface 104. Each staggered periodic riblet 102 (e.g., third periodic riblet 130) of FIG. 1B includes transition region 145a and transition region 145b. Transition region 145a is located at a first end of each staggered periodic riblet 102 and transition region 145b is located at a second end of each staggered periodic riblet 102.

Each staggered periodic riblet 102 of FIG. 1B has a length L1. In certain embodiments, length L1 is less than 0.10 inches. For example, length L1 may be between 0.04 inches and 0.08 inches. In the illustrated embodiment of FIG. 1B, length L1 is 0.06 inches. Each transition region 145a and each transition region 145b of staggered periodic riblet 102 has a length L2. In certain embodiments, length L2 is less than 0.05 inches. For example, length L2 may be between 0.01 inches and 0.02 inches. In the illustrated embodiment of FIG. 1B, length L2 is 0.015 inches. Each peak of each staggered periodic riblet 102 has a length L3. In certain embodiments, length L3 is less than 0.06 inches. For example, length L3 may be between 0.02 inches and 0.04 inches.

In the illustrated embodiment of FIG. 1B, length L1 is 0.03 inches. Length L1 of each staggered periodic riblet 102 equals the sum of length L2 of transition region 145a, length L3 of peak 106, and length L2 of transition region 145b. Length L1 of staggered periodic riblets 102 of physical object 100 runs parallel to a flow direction 155. For example, physical object 100 may be a wing of an aircraft, and length L1 of staggered periodic riblets 102 of physical object 100 may run parallel to flow direction 155 generated by the aircraft when the aircraft is in flight. In certain embodiments, length L1 of each staggered periodic riblet 102 is within a range of 8 to 100 times longer than a maximum height of each respective staggered periodic riblet 102.

The surface of each transition region 145a and each transition region 145b of each staggered periodic riblet 102 intersects smooth surface 104 such that an edge is created along smooth surface 104. Transition regions 145a and 145b may be constructed such that the sum of the increasing area in the longitudinal direction on transition region 145a is equal to the decreasing cross sectional area of transition region 145b. In certain embodiments, transition regions 145a an 145b are constructed with linear growth in the cross sectional area in the longitudinal direction for transition region 145a and linear decrease in the longitudinal direction in the cross sectional area of downstream transition region 145b. This construction maintains a constant longitudinal cross sectional area for overlapping transitional regions 145.

In certain embodiments, for transitional regions 145 having a geometrically similar cross section in the longitudinal direction, the height of each transition region 145 is defined by a parabolic shape. A leading edge of transition region 145a may be at an angle 170 of 90 degrees to smooth surface 104. The ridge of transition section 145a is convex to the external flow from flow direction 155 and meets peak 130 with an angular discontinuity. A trailing edge of transition region 145b may be at an angle 172 of 90 degrees to smooth surface 104. In some embodiments, the cross sectional shape of transition regions 145 in the longitudinal direction may vary while maintaining the linear longitudinal change in the cross sectional area. In certain embodiments, the height of one or more transition regions 145 may be defined by a non-parabolic shape (e.g., a linear shape).

Transition region 145b at the second end of each first periodic riblet 110 overlaps transition region 145a at the first end of each second periodic riblet 120. Transition region 145b at the second end of each second periodic riblet 120 overlaps transition region 145a at the first end of each third periodic riblet 130. Transition region 145b at the second end of each third periodic riblet 130 overlaps transition region 145a at the first end of each fourth periodic riblet 140. In certain embodiments, the intermittent pattern created by first periodic riblets 110, second periodic riblets 120, third periodic riblets 130, and fourth periodic riblets 140 repeats along a predetermined length. For example, this intermittent pattern may repeat along the width of an airplane wing.

Staggered riblets 102 are staggered such that a cross sectional area as measured above smooth surface 104 of physical object 100 is approximately the same at any cross section through longitudinal section 150. For example, the total cross sectional area of a cross section taken through peak 130 of third periodic riblet 130 (which includes the cross sectional areas of a plurality of third periodic riblets 130) is approximately the same as the total cross sectional area of a cross section taken through transition region 145a of third periodic riblet 130 (which includes the cross sectional areas of a plurality of second periodic riblets 120 and a plurality of third periodic riblets 130.) Maintaining a constant cross-sectional area of staggered periodic riblets 102 in flow direction 155 reduces the pressure drag penalty as compared to other riblet patterns, as illustrated in FIG. 3A, FIG. 3B, and FIG. 4 below.

FIG. 2A illustrates an example cross section 200 of a protruding riblet pattern 210. Protruding riblet pattern 210 is a pattern of protruding riblets 212 that protrude above a plane of an adjacent surface. For example, referring to the illustrated embodiment of FIG. 1A, protruding riblets 212 would be located above the plane of smooth surface 104 of first periodic riblets 110 of physical object 100 such that each valley between adjacent protruding riblets 212 may be located along the plane of smooth surface 104 of first periodic riblets 110 of physical object 100. A physical object having a ribbed surface of protruding riblets 212 experiences less friction drag when subjected to dynamic (e.g., aerodynamic or hydrodynamic) flow than a comparable physical object having a smooth surface. However, due to the geometry of protruding riblet pattern 210, a physical object having a ribbed surface of protruding riblets 212 experiences higher pressure drag when subjected to dynamic flow than a comparable physical object having a smooth surface.

In the illustrated embodiment of FIG. 2A, protruding riblet pattern 210 protrudes above baseline 220. Baseline 220 is equivalent to a plane of an adjacent surface (e.g., smooth surface 104 of FIG. 1A). Protruding riblet pattern 210 of FIG. 2A is a sawtooth pattern. Each protruding riblet 212 of protruding riblet pattern 210 has a peak 214. Peak 214 of each protruding riblet 212 has a height relative to baseline 220 of less than 0.002 inches. In certain embodiments, the height of each peak 214 of each protruding riblet 212 may be within a range of 0.001 inches to 0.002 inches (e.g., 0.0018 inches). Each peak 214 of each protruding riblet 212 forms an angle 230. Angle 230 may range from 45 degrees to 135 degrees. In the illustrated embodiment of FIG. 2A, angle 230 is 90 degrees. In certain embodiments, each protruding riblet 212 may be a two-dimensional (2D), thin plate riblet that is perpendicular to and located above baseline 220 of cross section 200. The 2D, thin plate riblets may create a series of channels with thin blades defining the channel walls.

Adjacent protruding riblets 212 of protruding riblet pattern 210 form valleys 216. Each valley 216 of each protruding riblet 212 is located at baseline 220. Each valley 216 forms an angle 240. Angle 240 may range from 45 degrees to 135 degrees. In the illustrated embodiment of FIG. 2A, angle 240 is 90 degrees. In some embodiments, one or more valleys 216 may be located above baseline 220. For example, each valley 216 of each protruding riblet 212 may be located 0.0002 inches above baseline 220.

Each protruding riblet 212 of protruding riblet pattern 210 of FIG. 2A is in the shape of a triangle. Each protruding riblet 212 may be equal in size, shape, and/or orientation relative to baseline 220. In the illustrated embodiment of FIG. 2A, each protruding riblet 212 of protruding riblet pattern 210 has two sides 242 and a base 244. Each side 242 of each protruding riblet 212 has a length less than 0.004 inches. In certain embodiments, the length of each side 242 of each protruding riblet 212 of protruding riblet pattern 210 is within a range of 0.002 inches to 0.003 inches (e.g., 0.0025 inches). Each base 244 of each protruding riblet 212 has a length less than 0.004 inches. In certain embodiments, the length of each base 244 of each protruding riblet 212 of protruding riblet pattern 210 is within a range of 0.003 inches to 0.004 inches (e.g., 0.0035 inches).

Although cross section 200 of FIG. 2A illustrates a particular number of protruding riblets 212, peaks 214, and valleys 216, this disclosure contemplates any suitable number of protruding riblets 212, peaks 214, and valleys 216. For example, protruding riblet pattern 210 of FIG. 2A may include more or less than seven protruding riblets 212. Although cross section 200 of FIG. 2A illustrates a particular arrangement of protruding riblets 212, peaks 214, and valleys 216, this disclosure contemplates any suitable arrangement of protruding riblets 212, peaks 214, and valleys 216. For example, two or more protruding riblets 212 of FIG. 2A may have different sizes, shapes, and/or orientations. As another example, two or more peaks 214 of two or more protruding riblets 212 may have different heights above baseline 220. As still another example, one or more peaks 214 and/or valleys 216 of one or more protruding riblets 212 may have a rounded point. As yet another example, the length of sides 242 and base 244 may be the same to form equilateral triangles.

As illustrated in cross section 200 of FIG. 2A, the geometry of a ribbed surface of a physical object that uses protruding riblet pattern 210 increases the wetted area as compared to a smooth surface. As such, while a physical object with a protruding ribbed surface that uses protruding riblet pattern 210 experiences less friction drag when subjected to dynamic flow than a comparable physical object having a smooth surface, the pressure drag increases due to the increased projected area in the flow direction.

FIG. 2B illustrates an example cross section 250 of a staggered riblet pattern 260. Staggered riblet pattern 260 is a pattern of repeating staggered riblets that are located above a plane of a smooth surface. For example, staggered periodic riblets 262 may be equivalent to staggered periodic riblets 102 of FIG. 1A, which are located above the plane of smooth surface 104 of physical object 100. A physical object with a staggered ribbed surface that uses staggered riblet pattern 260 experiences less friction drag when subjected to dynamic flow than a comparable physical object having a smooth surface. While a physical object with a staggered ribbed surface that uses staggered riblet pattern 260 experiences higher pressure drag when subjected to dynamic flow than a comparable physical object having a smooth surface, the pressure drag created by staggered riblet pattern 260 is significantly less than the pressure drag created by protruding riblet pattern 210 of FIG. 2A.

In the illustrated embodiment of FIG. 2B, staggered riblet pattern 260 is staggered above baseline 270. Baseline 270 is equivalent to a plane of a smooth surface (e.g., smooth surface 104 of FIG. 1A). Staggered riblet pattern 260 of FIG.

2B is a variant of a sawtooth pattern with a space between each of the teeth. Each staggered riblet 262 of staggered riblet pattern 250 has a peak 264 located above baseline 270. Each peak 264 of each staggered riblet 262 has a height relative to baseline 270 of less than 0.002 inches. Each peak 264 forms an angle 280. Angle 280 may range from 45 degrees to 135 degrees. In the illustrated embodiment of FIG. 2B, angle 280 is 90 degrees.

Adjacent staggered riblets 262 of staggered riblet pattern 260 form valleys 266. Each valley 266 of each staggered riblet 262 is located along baseline 270. Each valley 266 of each staggered riblet 262 includes a space between staggered riblets 262 and forms an angle 290 at an intersection of each adjacent staggered riblet 262. Angle 290 may range from 45 degrees to 135 degrees. In the illustrated embodiment of FIG. 2B, angle 290 is 90 degrees.

Each staggered riblet 262 of staggered riblet pattern 260 of FIG. 2B is in the shape of a triangle. Each staggered riblet 262 may be equal in size, shape, and/or orientation. Each staggered riblet 262 of staggered riblet pattern 260 has two sides 292 and a base 294. Each side 292 of each staggered riblet 262 has a length less than 0.004 inches. In certain embodiments, the length of each side 292 of each staggered riblet 262 of staggered riblet pattern 260 is within a range of 0.002 inches to 0.003 inches (e.g., 0.0025 inches). Each base 294 of each staggered riblet 262 has a length less than 0.004 inches. In certain embodiments, the length of each base 294 of each staggered riblet 262 of staggered riblet pattern 260 is within a range of 0.003 inches to 0.004 inches (e.g., 0.0035 inches). In the illustrated embodiment of FIG. 2B, the space along each valley 266 between adjacent staggered riblets 262 is equal in length to the length of base 294.

The sizes of staggered riblets 262 depends on the application of staggered riblet pattern 260. For example, the size of each staggered riblet 262 may depend on the speed of fluid, the viscosity and/or density of the fluid, the scale of the object (e.g., physical object 100 of FIG. 1A), etc. In certain applications, staggered riblets 262 are less than a hundredth of an inch in depth. For a highly viscous fluid (e.g., oil), staggered riblets 262 may be greater than a hundredth of an inch in depth. In certain embodiments, staggered riblets 262 may be sized using turbulent wall scaling. For example, staggered riblets 262 may be sized according to the following formula: non-dimensional scaling h+=(height)*sqrt((density)*(wall shear stress))/(viscosity), where h+ may be set to a value between 5 and 16. As another example, staggered riblets 262 may be sized according to the following formula: nondimensional spanwise spacing s+=(height)*sqrt((density)*(wall shear stress))/(viscosity), where s+ may be set to a value between 8 and 25.

Although cross section 250 of FIG. 2B illustrates a particular number of staggered riblets 262, peaks 264, and valleys 266, this disclosure contemplates any suitable number of staggered riblets 262, peaks 264, and valleys 266. For example, staggered riblet pattern 260 of FIG. 2B may include more or less than four staggered riblets 262. Although cross section 250 of FIG. 2B illustrates a particular arrangement of staggered riblets 262, peaks 264, and valleys 266, this disclosure contemplates any suitable arrangement of staggered riblets 262, peaks 264, and valleys 266. For example, two or more staggered riblets 262 of FIG. 2B may have different sizes, shapes, and/or orientations. As another example, two or more peaks 262 may have different heights relative to baseline 270. As still another example, the length of sides 292 and base 294 of one or more staggered riblets 262 may be the same to form equilateral triangles.

FIG. 3A illustrates an example pressure pattern 300 associated with a protruding riblet pattern 340 (e.g., protruding riblet pattern 210 of FIG. 2A). Pressure pattern 300 was created using a simulation of a small scale structure 310 representative of a physical object (e.g., physical object 100 of FIG. 1A). The simulation was performed in a low Reynolds number channel with limited spanwise and streamwise extent. The effects of the pressure gradients illustrated in FIG. 3A were assessed from a highly resolved computational large eddy simulation of the riblet configuration in a channel flow. The simulation mimics the flow of a fluid (e.g., a liquid or gas) on a surface having a protruding riblet pattern. The flow direction 305 is parallel to the protruding riblets of protruding riblet pattern 340. The output of the simulation is displayed in FIG. 3A as pressure pattern 300.

Structure 310 of pressure pattern 300 includes smooth surfaces 320 similar to smooth surface 104 of FIG. 1A. Structure 310 of pressure pattern 300 includes protruding ribbed surfaces 330 that protrude above the plane of smooth surfaces 320. Protruding ribbed surfaces 330 form protruding riblet pattern 340. In the illustrated embodiment of FIG. 3A, protruding riblet pattern 340 is a sawtooth pattern similar to protruding riblet pattern 210 of FIG. 2A.

Pressure pattern 300 of FIG. 3A shows a distribution of constant pressure (Cp) as generated by the simulation. Cp is a non-dimensional parameter defined as a non-dimensional ratio of a difference between a local pressure and a free stream pressure and a dynamic pressure in a free stream region. A Cp value of zero indicates that the pressure at a particular point is the same as the free stream pressure, a Cp value of one indicates a stagnation point, and a CP value less than zero indicates that the local velocity is greater than the free stream velocity. In the illustrated embodiment of FIG. 3A, Cp represents a time average pressure taken over a predetermined amount of time. Cp is represented as a grayscale in the embodiment of FIG. 3A. The lowest Cp value (i.e., −0.040) is the darkest shade in the grayscale and the highest Cp value (i.e., 0.040) is the lightest shade in the grayscale. As such, the grayscale lightens in shade as the Cp value increases.

As indicated by the different shades of gray in pressure output pattern 300 of FIG. 3A, protruding riblet pattern 340 produces a large variant of Cp values ranging from −0.040 to 0.040. The highest Cp values are generated in forward facing transition regions 344 between smooth surfaces 320 and protruding riblet surfaces 330 as the flow travels in flow direction 305 from smooth surfaces 320 to protruding riblet surfaces 330. The lowest Cp values are generated in apt facing transition regions 346 between smooth surfaces 320 and protruding riblet surfaces 330 as the flow travels in flow direction 305 from protruding ribbed surfaces 330 to smooth surfaces 320. The staggered riblet pattern mitigates these pressure differentials by producing a more constant pressures over the surfaces of the structure, as described below in FIG. 3B.

FIG. 3B illustrates an example pressure pattern 350 associated with a staggered riblet pattern 390 (e.g., staggered riblet pattern 260 of FIG. 2B). Pressure pattern 350 was created using the same simulation technique of FIG. 3A. The flow direction 355 is parallel to the staggered riblets of staggered riblet pattern 390. The output of the simulation is displayed in FIG. 3B as pressure pattern 350.

Structure 360 of pressure pattern 350 includes smooth surface 370 similar to smooth surface 104 of FIG. 1A. Structure 360 of pressure pattern 350 includes staggered riblets 380 that protrude above the plane of smooth surface 370. Staggered riblets 380 form staggered riblet pattern 390. In the illustrated embodiment of FIG. 3B, staggered riblet pattern 390 is equivalent to staggered riblet pattern 260 of FIG. 2B.

As indicated by the different shades of gray in pressure output pattern 350 of FIG. 3B, staggered riblet pattern 390 produces a small variant of Cp values ranging from 0 to 0.008. Positive Cp values are generated along staggered riblet pattern 390. The highest Cp values are generated in transition regions 394 as the flow travels in flow direction 355 from smooth surface 370 to each staggered riblet 380. As such, staggered riblet pattern 390 shown in FIG. 3B mitigates the pressure differentials shown in pressure pattern 300 of FIG. 3A by producing almost constant pressures over the surfaces of structure 360.

FIG. 4 illustrates an example bar chart 400 that compares drag produced by a physical object having a protruding riblet pattern to a physical object having a staggered riblet pattern. The pressure drag and viscous drag increments are calculated from a time average of the forces in a computational large eddy simulation of the flow in a channel with constant cross section in the spanwise direction. Periodic boundary conditions are applied in the spanwise direction to approximate a 2D channel flow of infinite span. The simulation includes a smooth surface on one wall of the channel and a riblet wall on the opposing channel wall. The difference in the drag components between the smooth wall and the riblet wall provides the increments shown in FIG. 4.

Bar chart 400 includes drag differences for a protruding riblet pattern 410 and a staggered riblet pattern 420. Protruding riblet pattern 410 is equivalent to protruding riblet pattern 210 of FIG. 2A. Staggered riblet pattern 410 is equivalent to staggered riblet pattern 260 of FIG. 2B. The drag for protruding riblet pattern 410 and staggered riblet pattern 420 is measured as a percentage difference from the drag generated by a smooth surface without riblets. Pressure drag differences, friction (e.g., viscous) drag differences, and total drag differences are provided in bar chart 400.

Protruding riblet pattern 410, as illustrated in bar chart 400 of FIG. 4, generates a percent pressure drag difference 412 of positive seven percent, which indicates that protruding riblet pattern 410 generates a pressure drag that is seven percent greater than the negligible pressure drag generated by a smooth surface. Protruding riblet pattern 410 generates a percent viscous drag difference 414 of negative five percent, which indicates that protruding riblet pattern 410 generates a viscous drag that is five percent lower than the viscous drag generated by a smooth surface. The total drag difference, which is calculated by adding pressure drag difference 412 and viscous drag difference 414 of protruding riblet pattern 410, is positive two percent, which indicates that protruding riblet pattern 410 generates a total drag that is two percent higher than the total drag generated by a smooth surface. Thus, while protruding riblet pattern 410 is effective at reducing viscous drag as compared to a smooth surface without riblets, protruding riblet pattern 410 increases the overall drag when taking into consideration pressure drag.

Staggered riblet pattern 420, as illustrated in bar chart 400 of FIG. 4, generates a percent pressure drag difference 422 of positive 0.8 percent, which indicates that staggered riblet pattern 420 generates a pressure drag that is 0.8 percent greater than the pressure drag generated by a smooth surface. Staggered riblet pattern 420 generates a percent viscous drag difference 424 of negative six percent, which indicates that staggered riblet pattern 420 generates a viscous drag that is six percent lower than the viscous drag generated by a smooth surface. The total drag difference, which is calculated by adding pressure drag difference 422 and viscous drag difference 424 of staggered riblet pattern 420, is negative 5.2 percent, which indicates that staggered riblet pattern 420 generates a total drag that is 5.2 percent lower than the total drag generated by a smooth surface. Thus, staggered riblet pattern 420 is effective at reducing viscous drag as compared to a smooth surface without riblets and is also effective at reducing the overall drag when taking into consideration both viscous drag and pressure drag.

FIG. 5 illustrates an example method 500 for reducing drag on a surface having a staggered riblet pattern, in accordance with an example embodiment. Method 500 starts at step 505. At step 510, first periodic riblets (e.g., first periodic riblets 110 of FIG. 1) are formed on a smooth surface (e.g., smooth surface 104 of FIG. 1A) of a physical object (e.g., physical object 100 of FIG. 1A). The physical object may be a component (e.g., a portion of an outer body) of an aircraft (e.g., an airplane, a helicopter, a blimp, a drone, etc.), a component of a of a marine vessel (e.g., a cargo ship, a passenger ship, a canoe, a raft, etc.), a component of a motorized vehicle (e.g., a truck, a car, a train, a scooter, etc.), a component of a non-motorized vehicle (e.g., a bicycle, a skateboard, etc.), a component of a spacecraft (e.g., a spaceship, a satellite, etc.), a wind turbine, a projectile (e.g., a missile), or any other physical object that is capable of experiencing drag. Method 500 then moves from step 510 to step 515, where second periodic riblets (e.g., second periodic riblets 120 of FIG. 1) are formed on the smooth surface of the physical object.

Method 500 then moves from step 515 to step 520, where a first transition region (e.g., transition region 145a of FIG. 1B) is formed at a first end (e.g., first end 112 of FIG. 1A) of each first periodic riblet and a second transition region (e.g., transition region 145b of FIG. 1B) is formed at a second end (e.g., second end 114 of FIG. 1A) of each first periodic riblet. The transition regions may be approximately the same length. An angle between a surface of each transition region and the smooth surface may be the same. For example, each angle between the surface of each transition region and the smooth surface of each staggered periodic riblet may be approximately 170 degrees. Method 500 them moves from step 520 to step 525. At step 525, a first transition region is formed at a first end of each second periodic riblet and a second transition region is formed at a second end of each second periodic riblet. Method 500 then moves from step 525 to step 530.

At step 530, each second transition region at the second end of each first periodic riblet is overlapped with each first transition region at each first end of each second periodic riblet. The transition regions are overlapped such that a cross sectional area as measured above the smooth surface of the physical object is the same at any cross section through the first and second periodic riblets. For example, a cross sectional area as measured at a cross section cut through a peak of first periodic riblets is the same as a cross sectional area as measured at a cross section cut through the overlapping transition regions of the first and second periodic riblets. Method 500 then moves from step 530 to step 535.

At step 535, a flow is generated over the smooth surface and the first and second periodic riblets of the physical object. For example, the flow may be generated by an airplane moving through the air at a predetermined speed. The flow direction (e.g., flow diction 335 of FIG. 3B) runs parallel to the length of each riblet of the staggered periodic riblets. Method 500 then moves from step 535 to step 540, where method 500 determines whether the flow is a gas or a liquid.

If the flow is a gas (e.g., air), method 500 moves from step 540 to step 545, where an aerodynamic drag is generated over the staggered riblet pattern that is less than the total aerodynamic drag (i.e., pressure drag and viscous drag) produced by generating a flow over a smooth surface without riblets. As indicated in FIG. 4 above, the aerodynamic drag generated over the staggered riblet pattern that is less than the total aerodynamic drag produced by generating a flow over a protruding riblet pattern (e.g., protruding riblet pattern 410 of FIG. 4). As such, the staggered riblet pattern reduces drag over aerodynamic surfaces, which may reduce fuel costs and increase range in vehicles (e.g., aircraft) utilizing the staggered riblet pattern.

If the flow is a liquid (e.g., water), method 500 advances from step 540 to step 550, where a hydrodynamic drag is generated over the staggered riblet pattern that is less than the total hydrodynamic drag (i.e., pressure drag and viscous drag) produced by generating a flow over a smooth surface without riblets. As indicated in FIG. 4 above, the hydrodynamic drag generated over the staggered riblet pattern that is less than the total hydrodynamic drag produced by generating a flow over a protruding riblet pattern (e.g., protruding riblet pattern 410 of FIG. 4). As such, the staggered riblet pattern reduces drag over hydrodynamic surfaces, which may reduce fuel costs and increase range in vehicles (e.g., marine vessels) utilizing the staggered riblet pattern. Method 500 then moves from steps 545 and 550 to step 555, where method 500 ends.

Modifications, additions, or omissions may be made to method 500 depicted in FIG. 5. Method 500 may include more, fewer, or other steps. For example, method 500 may include forming each peak of each riblet of the periodic riblets at an angle between 45 degrees and 135 degrees (e.g., 90 degrees.) As another example, method 500 may repeat steps 510 through 525 to form an intermittent pattern along a predetermined length of a component (e.g., an aircraft wing.) Steps of method 500 depicted in FIG. 5 may be performed in parallel or in any suitable order. Any suitable component may perform any step of method 500. For example, one or more machines (e.g., robotic machines) may be used to form one or more surfaces of the physical object.

FIG. 6 illustrates an example physical object 600 with staggered periodic riblets 702 having a different size and shape than staggered periodic riblets 102 of FIG. 1A. Physical object 600 is similar to physical object 100 except as follows. A cross section of each staggered periodic riblet 602 of FIG. 6 forms an equilateral triangle such that a length of each base (e.g., base 294 of FIG. 2B) of each staggered periodic riblet 602 is the same as a length of each side (e.g., sides 292 of FIG. 2B) of each staggered periodic riblet 602. The height of each peak 606 of each staggered periodic riblet 602 above a plane (e.g., plane 180 of FIG. 1B) of smooth surface 604 is less than the height of each peak 106 of each staggered periodic riblet 102 of FIG. 1A. For example, the height of each peak 606 of each staggered periodic riblet 602 above a plane of smooth surface 604 may be less than 0.0018 inches (e.g., 0.0015 inches.) Transition regions 645 of FIG. 6 are regions staggered periodic riblets 602 overlap.

FIG. 7 illustrates an example physical object 700 with staggered periodic riblets 702 having a different size, shape, and arrangement than staggered periodic riblets 102 of FIG. 1A. Physical object 700 is similar to physical object 100 of FIG. 1A except as follows. A cross section of each staggered periodic riblet 702 of FIG. 7 forms an equilateral triangle such that a length of each base (e.g., base 294 of FIG. 2B) of each staggered periodic riblet 702 is the same as a length of each side (e.g., sides 292 of FIG. 2B) of each staggered periodic riblet 702. The height of each peak 706 of each staggered periodic riblet 702 above a plane (e.g., plane 180 of FIG. 1B) of smooth surface 704 is greater than the height of each peak 106 of each staggered periodic riblet 102 of FIG. 1A. For example, the height of each peak 706 of each staggered periodic riblet 702 above a plane of smooth surface 704 may be greater than 0.0018 inches (e.g., 0.002 inches.)

Each staggered periodic riblet 702 of physical object 700 has a length L1. In the illustrated embodiment of FIG. 7, each length L1 is 0.07 inches. Length L2 represents a length of each transition region 745 of each staggered periodic riblet 702. Transition regions 745 are regions where staggered periodic riblets 702 overlap. In the illustrated embodiment of FIG. 7, each length L2 of each transition region 745 is 0.025 inches. Each peak 706 of each staggered periodic riblet 102 has a length L3. In the illustrated embodiment of FIG. 7, each length L3 of peach peak 706 is 0.02 inches. Length L1 of each staggered periodic riblet 702 equals the sum of length L2 of transition region 745 at a first end of each staggered periodic riblet 702, length L3 of peak 706, and length L2 of transition region 745 at a second end of each staggered periodic riblet 702. In the illustrated embodiment of FIG. 7, the length of smooth surface 704 between ends of staggered periodic riblets is 0.02 inches.

Although physical objects 600 and 700 of FIGS. 6 and 7 illustrate a particular number of staggered periodic riblets 602 and 702, smooth surfaces 604 and 704, peaks 606 and 706, valleys 608 and 708, and transition regions 645 and 745, this disclosure contemplates any suitable number of staggered periodic riblets 602 and 702, smooth surfaces 604 and 704, peaks 606 and 706, valleys 608 and 708, and transition regions 645 and 745.

Although physical objects 600 and 700 of FIGS. 6 and 7 illustrate a particular arrangement of staggered periodic riblets 602 and 702, smooth surfaces 604 and 704, peaks 606 and 706, valleys 608 and 708, and transition regions 645 and 745, this disclosure contemplates any suitable arrangement of staggered periodic riblets 602 and 702, smooth surfaces 604 and 704, peaks 606 and 706, valleys 608 and 708, and transition regions 645 and 745. In certain embodiments, staggered periodic riblets 702 may be spaced further apart or closer together. For example, staggered periodic riblets 702 may be continuous along a length of physical object 700 such that an end of a first staggered periodic riblet 702 touches an end of a second staggered periodic riblet 702.

Embodiments of this disclosure may be applied to any fluid flow application where the turbulent boundary layer is turbulent and skin friction is significant. For example, embodiments of this disclosure may be used to reduce internal flow drag in propulsion systems, reduce pipe flow drag, reduce drag in automotive systems, and the like.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for reducing drag, comprising:
   forming first periodic riblets on a smooth surface of a physical object:
   forming second periodic riblets on the smooth surface of the physical object; and generating a flow over the first and second periodic riblets of the physical object:
   wherein:
      each first periodic riblet comprises a first transition region at a first end of each first periodic riblet and a second transition region at a second end of each first periodic riblet:
      each second periodic riblet comprises a first transition region at a first end of each second periodic riblet and a second transition region at a second end of each second periodic riblet:
      each second transition region at the second end of each first periodic riblet overlaps each first transition region at the first end of each second periodic riblet:
      a length of each riblet of the first and second periodic riblets runs parallel to a direction of the flow:
      a maximum height of each riblet of first and second periodic riblets is less than 0.002 inches:
      a maximum width of each riblet of the first and second periodic riblets is less than 0.004 inches;
      the length of each first and second riblet that runs parallel to the direction of flow is within a range of 8 to 100 times longer than the maximum height of each respective riblet; and
   generating a constant cross-sectional area through the first and second periodic riblets as measured above the smooth surface of the physical object by compensating a decreasing volume of a trailing edge of the first and second periodic riblets with an increasing volume of the neighboring first and second periodic riblets.

2. The method of claim 1, wherein a length of each first transition region of each first periodic riblet, a length of each second transition region of each first periodic riblet, a length of each first transition region of each second periodic riblet, and a length of each second transition region of each second periodic riblet are the same.

3. The method of claim 1, further comprising:
   forming third periodic riblets on the smooth surface of the physical object; and
   forming fourth periodic riblets on the smooth surface of the physical object:
   wherein:
      each third periodic riblet comprises a first transition region at a first end of each third periodic riblet and a second transition region at a second end of each third periodic riblet:
      each fourth periodic riblet comprises a first transition region at a first end of each fourth periodic riblet and a second transition region at a second end of each fourth periodic riblet:
      each first transition region at the first end of each third periodic riblet overlaps each second transition region at the second end of each second periodic riblet; and
      each second transition region at the second end of each third periodic riblet overlaps each first transition region at the first end of each fourth periodic riblet.

4. The method of claim 1, wherein the first transition region at the first end of each first periodic riblet, the second transition region at the second end of each first periodic riblet, the first transition region at the first end of each second periodic riblet, and the second transition region at the second end of each second periodic riblet each form a parabolic curve.

5. The method of claim 1, wherein the physical object is one of the following:
   an aircraft:
   a marine vessel:
   a vehicle; and
   a pipeline.

6. A physical object, comprising:
   a smooth surface:
   first periodic riblets on the smooth surface of a physical object; and
   second periodic riblets on the smooth surface of the physical object:
   wherein:
      each first periodic riblet comprises a first transition region at a first end of each first periodic riblet and a second transition region at a second end of each first periodic riblet:
      each second periodic riblet comprises a first transition region at a first end of each second periodic riblet and a second transition region at a second end of each second periodic riblet:
      each second transition region at the second end of each first periodic riblet overlaps each first transition region at the first end of each second periodic riblet; and
      a length of each riblet of the first and second periodic riblets runs parallel to a direction of the flow:
      a maximum height of each riblet of first and second periodic riblets is less than 0.002 inches:
      a maximum width of each riblet of the first and second periodic riblets is less than 0.004 inches;
      the length of each first and second riblet that runs parallel to the direction of flow is within a range of 8 to 100 times longer than the maximum height of each respective riblet-; and
   generating a constant cross-sectional area as measured above the smooth surface of the physical object is constant at any cross section through the first and second periodic riblets by compensating a decreasing volume of a trailing edge of each first and second periodic riblets with an increasing volume of neighboring periodic riblets.

7. The physical object of claim 6, wherein a length of each first transition region of each first periodic riblet, a length of each second transition region of each first periodic riblet, a length of each first transition region of each second periodic riblet, and a length of each second transition region of each second periodic riblet are the same.

8. The physical object of claim 6, further comprising:
third periodic riblets on the smooth surface of the physical object; and
fourth periodic riblets on the smooth surface of the physical object:
wherein:
each third periodic riblet comprises a first transition region at a first end of each third periodic riblet and a second transition region at a second end of each third periodic riblet:
each fourth periodic riblet comprises a first transition region at a first end of each fourth periodic riblet and a second transition region at a second end of each fourth periodic riblet:
each first transition region at the first end of each third periodic riblet overlaps each second transition region at the second end of each second periodic riblet; and
each second transition region at the second end of each third periodic riblet overlaps each first transition region at the first end of each fourth periodic riblet.

9. The physical object of claim 6, wherein the first transition region at the first end of each first periodic riblet, the second transition region at the second end of each first periodic riblet, the first transition region at the first end of each second periodic riblet, and the second transition region at the second end of each second periodic riblet each form a parabolic curve.

10. The physical object of claim 6, wherein the physical object is one of the following:
an aircraft:
a marine vessel:
a vehicle; and
a pipeline.

11. A method of manufacturing a physical object, comprising:
forming first periodic riblets on a smooth surface of a physical object; and
forming second periodic riblets on the smooth surface of the physical object:
wherein:
each first periodic riblet comprises a first transition region at a first end of each first periodic riblet and a second transition region at a second end of each first periodic riblet:
each second periodic riblet comprises a first transition region at a first end of each second periodic riblet and a second transition region at a second end of each second periodic riblet:

each second transition region at the second end of each first periodic riblet overlaps each first transition region at the first end of each second periodic riblet;
a length of each riblet of the first and second periodic riblets runs parallel to a direction of the flow:
a maximum height of each riblet of first and second periodic riblets is less than 0.002 inches;
a maximum width of each riblet of the first and second periodic riblets is less than 0.004 inches;
the length of each first and second riblet that runs parallel to the direction of flow is within a range of 8 to 100 times longer than the maximum height of each respective riblet; and
generating a constant cross-sectional area as measured above the smooth surface of the physical object is constant at any cross section through the first and second periodic riblets by compensating a decreasing volume of a trailing edge of each first and second periodic riblets with an increasing volume of neighboring periodic riblets.

12. The method of claim 11, wherein a length of each first transition region of each first periodic riblet, a length of each second transition region of each first periodic riblet, a length of each first transition region of each second periodic riblet, and a length of each second transition region of each second periodic riblet are the same.

13. The method of claim 11, further comprising:
forming third periodic riblets on the smooth surface of the physical object; and
forming fourth periodic riblets on the smooth surface of the physical object:
wherein:
each third periodic riblet comprises a first transition region at a first end of each third periodic riblet and a second transition region at a second end of each third periodic riblet:
each fourth periodic riblet comprises a first transition region at a first end of each fourth periodic riblet and a second transition region at a second end of each fourth periodic riblet:
each first transition region at the first end of each third periodic riblet overlaps each second transition region at the second end of each second periodic riblet; and
each second transition region at the second end of each third periodic riblet overlaps each first transition region at the first end of each fourth periodic riblet.

14. The method of claim 9, wherein the first transition region at the first end of each first periodic riblet, the second transition region at the second end of each first periodic riblet, the first transition region at the first end of each second periodic riblet, and the second transition region at the second end of each second periodic riblet each form a parabolic curve.

* * * * *